United States Patent Office 3,300,427
Patented Jan. 24, 1967

3,300,427
WATER-DILUTABLE RESOLE RESIN COMPOSITION CONTAINING A SULFO-ACID SALT SURFACTANT
Norman T. Hebert, Bay City, Mich., assignor to The Dow Chemical Company, Midland, Mich., a corporation of Delaware
No Drawing. Filed Aug. 8, 1962, Ser. No. 215,520
20 Claims. (Cl. 260—29.3)

This application is a continuation-in-part of my copending application Serial No. 2,810, filed January 18, 1960, now abandoned.

This invention relates to water-soluble resinous phenol-aldehyde condensates, commonly called resole resins.

In many uses for phenol-aldehyde resins, particularly in coating and adhesive applications, the resin is desirably prepared and applied in the form of an aqueous solution. The term "solution" as used herein includes only true solutions and colloidal solutions which are clear and transparent and are indistinguishable by appearance from true solutions. In a typical process, an aqueous alkaline solution of a phenol having at least two active hydrogens (ortho and/or para to the phenolic OH) and an aldehyde, usually formaldehyde, is heated until a suitable degree of polymerization is attained, at which point the polymerization is substantially stopped by cooling the solution and/or adjusting its pH to one less favorable to further polymerization. In such a process, the resin maker is in the dilemna of trying, on the one hand, to carry the polymerization as far as possible in order to produce a better resin, i.e., one having as high molecular weight as possible and to more fully utilize the phenol and aldehyde, and, on the other hand, avoiding carrying the polymerization to the point that the resin is precipitated from the solution as formed or when further diluted. It frequently happens that when the cooking step is carried too far the resin remains in solution in the high concentrations in which it is normally produced (40–60% solids) but precipitates when diluted to the concentrations at which it is generally used (15–25%).

When aqueous solutions of resole resins are applied to porous or fibrous materials, such as wood, sand, leather, fabrics, fibers and the like, it is important that the solution quickly and evenly wet and penetrate the substrate to which it is applied. This is particularly important in adhesive applications such as in the manufacture of sand molds and plywood.

Accordingly, it is an object of this invention to provide processes for the manufacture of resole resins wherein efficient utilization is made of the phenols and aldehydes used as raw materials. Another object is to provide resoles having a desirably high molecular weight, yet retaining adequate solubility and dilutability with water. Another object is to provide resole resins that may be stored for long periods without precipitation of the resin. Still another object is to provide resole resins which have unusual ability to quickly and uniformly wet and penetrate porous surfaces to which they are applied. Other objects will be apparent hereinafter.

In accord with the invention, one or more of the above objects is achieved by incorporating into a resole resin after it has been cooked, i.e., after the phenol-aldehyde condensation reaction has been carried to the desired end-point, a small but effective amount of an anionic surfactant of the sulfate or sulfonate salt type.

The resole resins used in practicing the invention are the alkali-catalyzed condensation products derived from phenol, alkylphenols, phenylphenol or other phenols usable in the production of conventional resole resins, and formaldehyde, formaldehyde-yielding materials or other aldehydes usable in the production of conventional resole resins. The phenols and the aldehydes usable in making resoles, and the proportions, catalysts, temperatures and other operating conditions useful for making resoles are well known in the art and are likewise operable in the present invention.

The surfactants useful in practicing the invention include the known higher alkyl sulfates and sulfonates, the alkyl and alkenyl sulfosuccinates, alkyldiphenyl oxide sulfonates, alkylnaphthalene sulfonates, sulfated aryl ethers of polyoxyalkylene glycols and, in general, any anionic surfactant of the sulfo-acid, i.e., sulfate or sulfonate, salt type.

Since most commercial surfactants are better known by their trade names than by their chemical names, those mentioned hereinafter are identified by trade name and chemical type.

The practice of the invention is illustrated by the following examples.

Example 1

One mole of phenol and 2.5 moles of formaldehyde in the form of a 37%, by weight, aqueous solution were mixed and the mixture then heated to 120° F. To this solution was slowly added, with effective agitation, 4% by weight, based on the phenol, of sodium hydroxide in the form of a 50%, by weight, aqueous solution. The mixture was then heated at 150–160° F. until polymerization had reached the point where dilution of a portion of the clear reaction mixture with water just produced a cloudiness at 3:1 dilution. The catalyst was neutralized, after which 10 cc. portions of the resin solution were taken for testing with surfactants.

The surfactant was sodium dodecyldiphenyl oxide disulfonate, sold by The Dow Chemical Company under the name Benax 2A1, an aqueous solution containing 45%, by weight, of the active ingredient. When 0.1 g. (100% active basis) of the Benax was added to 10 cc. of the resin solution, the dilution limit was raised from 3:1 to 6:1 while when 0.25 g. was added, the solution could be diluted 100-fold without precipitation of the resin or clouding of the solution.

Examples 2–7

The experiment of Example 1 was repeated except that various surfactants were used instead of Benax 2A1. The results are shown in Table I. In each example, a 10 cc. portion of the resole solution was used and the dilutability of the resin was determined by dilution with water until the solution became cloudy.

TABLE I

| Example | Surfactant | Chemical Type | Percent Active Ingredient | Amount Used | Cloud Point Dilution |
|---|---|---|---|---|---|
| 2 | Aerosol OT | Na Dioctyl Sulfosuccinate | 75 | 0.4 cc | 5:1 |
| 3 | Ultrawet K | Alkylbenzene Sulfonate | 88 | 0.5 g | 250:1 |
| 4 | do | do | 88 | 0.1 g | 5:1 |
| 5 | Petro AD | Alkylnaphthalene Sulfonate | 50 | 0.45 cc | 5:1 |
| 6 | Nopco 1408 | Sulfonated Castor Oil | 42 | 0.45 cc | 6:1 |
| 7 | Duponol C | Lauryl Sulfate | 88 | 0.5 g | 5:1 |

Examples 8–16

A resole resin was prepared as described in Example 1 except that the cooking (polymerization) was continued until the product would tolerate only a 1:1 dilution with water before precipitation began, as shown by cloud formation. Ten cc. portions of this resin solution (40% solids content) were then used to evaluate various surfactants in the same manner as in Examples 1–6. Results are shown in Table II.

TABLE II

| Example | Surfactant | Chemical Type | Percent Active Ingredient | Amount Used | Cloud Point Dilution |
|---|---|---|---|---|---|
| 8 | Aerosol OT | | 75 | 0.8 cc | 2:1 |
| 9 | Ultrawet K | | 45 | 1.0 cc | 2:1 |
| 10 | Petro AD | | 50 | 1.0 cc | 6:1 |
| 11 | Nopco 1408 | | 47 | 1.0 cc | 6:1 |
| 12 | Benax 2A1 | | 45 | 1.0 cc | 3:1 |
| 13 | Duponol C | | 88 | 1.0 g | 3:1 |
| 14 | Petrowet WN | Alkyl Sulfate | 35 | 1.0 cc | 6:1 |
| 15 | Teepol | do | 34 | 1.0 cc | 4:1 |
| 16 | Alipal CO 433 | Sulfonated Nonylphenyl Polyethylene Glycol Ether. | 28 | 1.0 cc | 2:1 |

In all the tests made it was found that after a resole solution, with or without surfactant, had been diluted until the cloud point had been passed, the cloudy solution could be cleared by adding more surfactant.

It was also observed that the storage life of resole resins was markedly increased by the addition thereto of a sulfate or sulfonate-type surfactant, this being noted especially with highly polymerized resins, such as that used in Examples 8–16. Any amount of surfactant was beneficial for the above purposes, the usually preferred amounts being about 0.1 to 10%, by weight, based on the solids content of the resin and the surfactant.

It was found that resoles made in accordance with the invention not only could be cooked to higher molecular weight while retaining adequate dilutability and storage life but such resin solutions showed markedly improved wetting and penetration when applied to porous materials, such as wood, paper, glass fibers, leather, cloth, sand and the like. This property makes them especially useful in the production of shell molds, sand molds, plywood, non-woven fabrics and the like.

I claim:

1. A composition consisting essentially of an aqueous solution of a resole resin containing, as a stabilizer against precipitation, a small but effective amount of an anionic surfactant which is a sulfo-acid salt, said solution containing not more than 25% by weight of resin solids, said solids being of such concentration and molecular weight that in the absence of said stabilizer they would precipitate from the solution.

2. A solution as defined in claim 1 wherein the surfactant is an alkylaryl sulfonate.

3. A solution as defined in claim 1 wherein the surfactant is an alkyldiphenyl oxide sulfonate.

4. A solution as defined in claim 1 wherein the surfactant is sodium dodecyldiphenyl oxide sulfonate.

5. A solution as defined in claim 1 wherein the surfactant is an alkylbenzene sulfonate.

6. A solution as defined in claim 1 wherein the surfactant is an alkylnaphthalene sulfonate.

7. A solution as defined in claim 1 wherein the surfactant is an alkyl sulfate.

8. A solution as defined in claim 1 wherein the surfactant is sulfonated castor oil.

9. A solution as defined in claim 1 wherein the surfactant is a sulfonated alkylphenyl ether of a polyoxyalkylene glycol.

10. A solution as defined in claim 1 wherein the resole resin is one produced by the alkaline condensation of phenol with formaldehyde.

11. The process of preparing a dilute aqueous solution of a resole resin containing not more than 25% of resin solids, which process comprises:
(A) mixing
  (1) a concentrated aqueous solution of the resin containing at least 40% of resin solids and
  (2) about 0.1% to 10%, based on resin solids, of a surfactant sulfo-acid salt, the amount of the salt being sufficient to prevent precipitation of the resin when the solution is diluted to a resin solids content of not more than 25%, and
(B) diluting with water the resulting mixture to a resin solids content of not more than 25%, all percentages being by weight.

12. The process defined in claim 11 wherein the surfactant is an alkylaryl sulfonate.

13. The process as defined in claim 11 wherein the surfactant is an alkyldiphenyl oxide sulfonate.

14. The process as defined in claim 11 wherein the surfactant is sodium dodecyldiphenyl oxide sulfonate.

15. The process as defined in claim 11 wherein the surfactant is an alkylbenzene sulfonate.

16. The process as defined in claim 11 wherein the surfactant is an alkylnaphthalene sulfonate.

17. The process as defined in claim 11 wherein the surfactant is an alkyl sulfate.

18. The process as defined in claim 11 wherein the surfactant is sulfonated castor oil.

19. The process as defined in claim 11 wherein the surfactant is a sulfonated alkylphenyl ether of a polyoxyalkylene glycol.

20. The process defined in claim 11 wherein the resole resin is one produced by the alkaline condensation of phenol with formaldehyde.

References Cited by the Examiner

UNITED STATES PATENTS

| | | | |
|---|---|---|---|
| 1,857,691 | 5/1932 | Mellanoff | 260—29.3 |
| 2,481,879 | 9/1949 | Ross | 260—29.3 |
| 2,839,434 | 6/1953 | Haughney et al. | 260—19 |
| 2,902,458 | 9/1959 | Teppema | 260—29.3 |
| 2,980,750 | 4/1961 | Mills | 252—351 |

OTHER REFERENCES

"Surface Active Agents and Detergents" by Schwartz et al., pages 55 and 63–91, Interscience Publishers, 1958.

MURRAY TILLMAN, *Primary Examiner.*

JAMES A. SEIDLECK, SAMUEL H. BLECH, J. J. NORRIS, J. C. BLEUTGE, *Assistant Examiners.*